United States Patent
Eshghi et al.

(10) Patent No.: US 7,761,458 B1
(45) Date of Patent: Jul. 20, 2010

(54) SEGMENTATION OF A DATA SEQUENCE

(75) Inventors: Kave Eshghi, Palo Alto, CA (US);
George Henry Forman, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 469 days.

(21) Appl. No.: 11/345,834

(22) Filed: Feb. 1, 2006

(51) Int. Cl.
*G06F 17/30* (2006.01)
*G06F 17/00* (2006.01)

(52) U.S. Cl. .................... 707/755; 707/705
(58) Field of Classification Search ............ 707/2–6, 707/100–102
See application file for complete search history.

(56) References Cited

U.S. PATENT DOCUMENTS

| | | | | |
|---|---|---|---|---|
| 7,058,644 | B2 * | 6/2006 | Patchet et al. | 707/101 |
| 7,062,507 | B2 * | 6/2006 | Wang et al. | 707/102 |
| 7,281,006 | B2 * | 10/2007 | Hsu et al. | 707/6 |

* cited by examiner

*Primary Examiner*—Yicun Wu (57) ABSTRACT

Provided are systems, methods and techniques for hierarchically segmenting a sequence of records, by specifying windows, each window encompassing a portion of the sequence. For each specified window, a function of the data records within that specified window is calculated in order to generate a function value for the window. The function values are then used to define a hierarchical arrangement in which the sequence is divided into a plurality of segments and the segments are divided into smaller segments.

26 Claims, 10 Drawing Sheets

SEGMENTATION OF A DATA SEQUENCE

FIELD OF THE INVENTION

The present invention pertains to the segmentation of a data sequence, such as a file, and is particularly applicable to segmentation techniques that are useful for identifying matching portions of two or more data sequences.

BACKGROUND

Figure 1A:
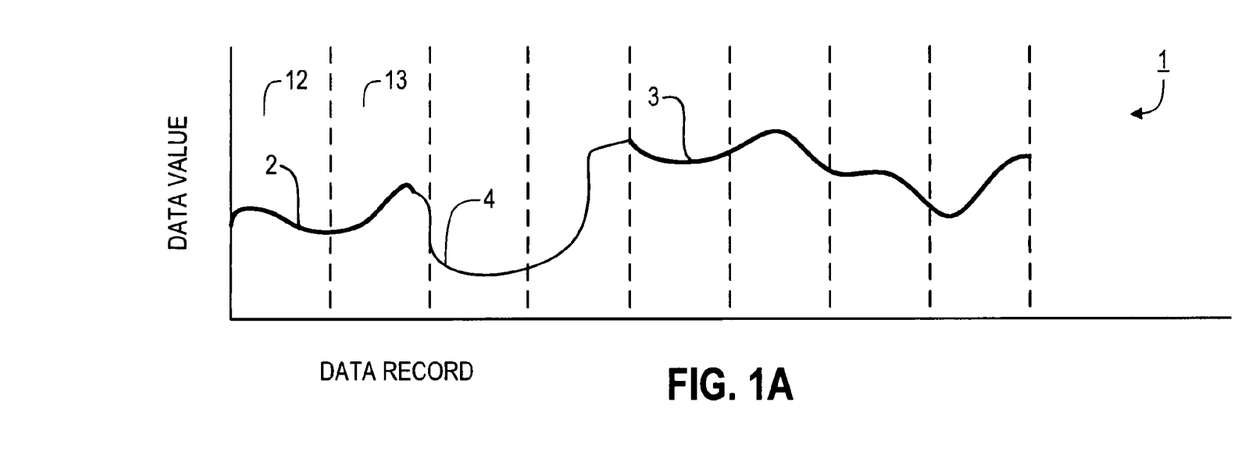
FIG. 1A illustrates the contents of a first file.
Figure 1B:
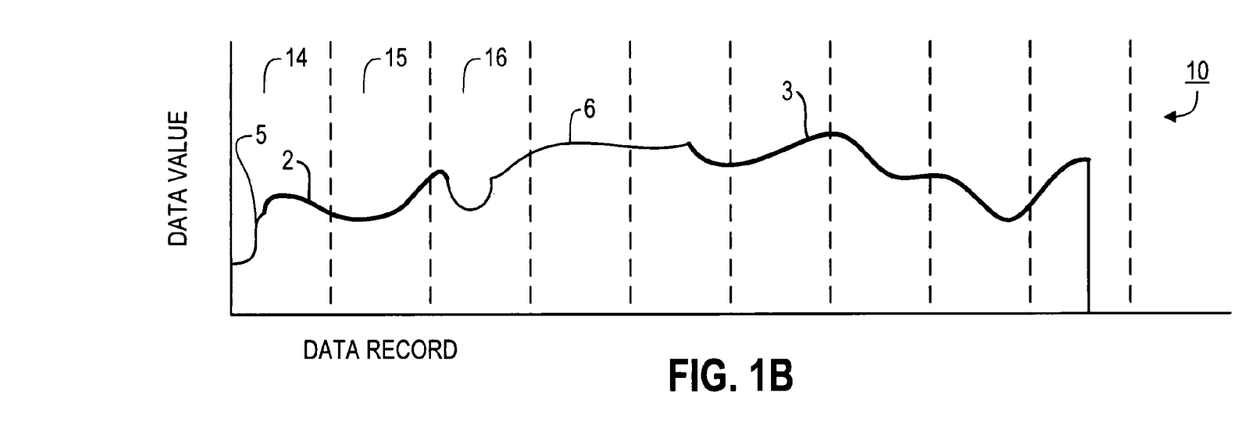
FIG. 1B illustrates the contents of a second file, from which one would like to identify identical segments.

A problem that arises in different contexts is the identification of portions of one file (i.e., contiguous strings of data) that are identical to portions of another file (i.e., identical strings of data in the other file). This problem is illustrated graphically in FIGS. 1A and 1B. More specifically, FIG. 1A illustrates the contents of a file 1 and FIG. 1B illustrates the contents of a file 10. For ease of illustration, the contents of files 1 and 10 are illustrated as being continuous functions, even though in practice this generally will not be the case, e.g., for documents that primarily include text (i.e., characters such as numbers and letters) or for extensible markup language (XML) documents.

The identical segments 2 and 3 that are common to both of files 1 and 10 are highlighted using thicker lines in FIGS. 1A and 1B in order to make them easy to identify visually. In practice, however, it generally is very difficult and processor-intensive to identify such common segments 2 and 3. This is because both of files 1 and 10 often will have other data segments 4-6 that are interspersed between the common segments 2 and 3. As a result, it typically is difficult to even identify where the common segments 2 and 3 begin in each of the files being compared. This problem is further compounded when a large number of files need to be compared in a very efficient manner.

A simple approach to the problem is to divide the file into regularly spaced intervals and then compare the intervals. However, as shown in FIGS. 1A and 1B, this approach does not work well unless the selected intervals are precisely positioned, relative to both of the files to be compared, at least with respect to the common segments 2 and 3.

Unfortunately, this is not the case in the present example. Here, segment 2 in file 1 is covered by intervals 12 and 13 while the identical segment 2 in file 10 is covered by intervals 14-16. Although segment 2 clearly is identical in both of files 1 and 10, merely comparing the data segment in either of intervals 12 and 13, on the one hand, with the data segment in any of intervals 14-16 would not indicate similarity. In fact, where sequences share multiple common segments that are separated from each other, it often will be impossible to identify on an a priori basis a single set of windows that will properly capture each common segment.

DESCRIPTION OF THE PREFERRED EMBODIMENT(S)

The present invention addresses the comparison problem outlined above by utilizing novel techniques that systematically divide a file (or other data-record sequence) into a hierarchical arrangement, e.g., a hash-based directed acyclic graph (HDAG). Stated differently, the present invention concerns techniques for transforming a linear sequence into a tree structure or other hierarchical arrangement such that if the two sequences share a subsequence, then the two trees share a sub-tree whose size is proportionate to the size of the shared subsequence. Once such a hierarchical arrangement has been generated for two data-record sequences, it typically is possible to easily compare and/or synchronize the two sequences, e.g., using known HDAG techniques, optimized to take advantage of the properties of the HDAGs generated pursuant to the present invention. Such comparison and synchronization has many useful applications, as described in more detail below.

Figure 2:
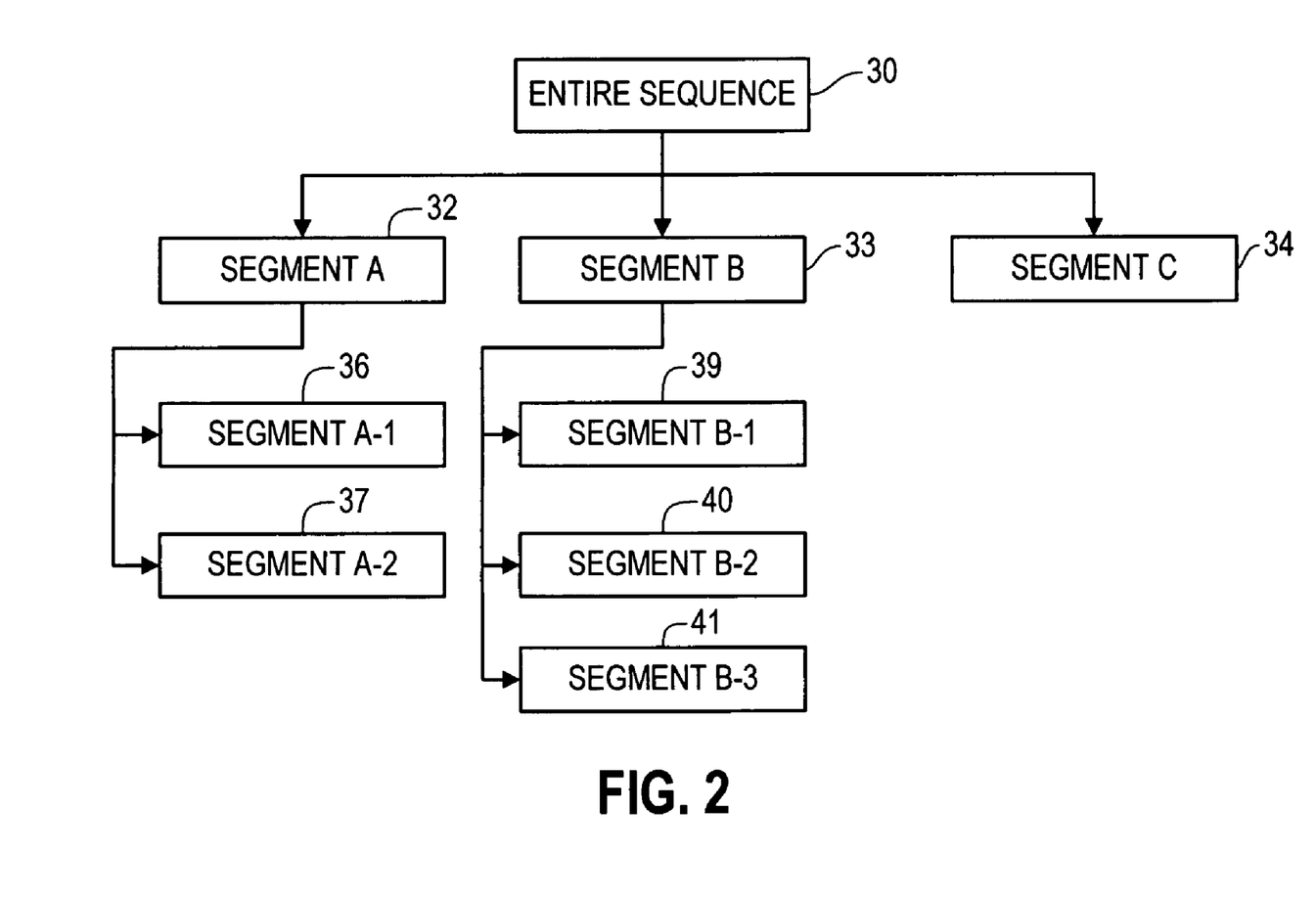
FIG. 2 is a block diagram illustrating the division of a data-record sequence according to a representative embodiment of the present invention.

FIG. 2 is a block diagram illustrating the division of a data-record sequence 30 according to a representative embodiment of the present invention. Initially, the entire sequence 30 is divided into three segments 32-34, each containing a contiguous string of data records. Then, two of the segments 32 and 33 are further divided into smaller segments, again each containing a contiguous string of data records. In the present example, segment 32 is divided into two segments 36 and 37, and segment 33 is divided into three segments 39-41. However, segment 34 is not further subdivided, e.g., because its length is less than a minimum specified threshold for further subdivision.

It is noted that for most purposes herein, the entire sequence 30 is treated the same as any other segment in the hierarchical arrangement and, unless the context clearly indicates to the contrary, the term segment also can refer to the entire starting data-record sequence 30. Also, as indicated above, the present invention generally is applicable to the hierarchical division of a sequence (i.e., one-dimensional string) of data records. That sequence may be in the form of a data file, but need not be specifically delineated as a distinct file.

Generally speaking, the smallest unit of data which is of concern in the present invention is called the data record. However, what constitutes a data record generally will be defined differently from embodiment to embodiment. In one representative embodiment, a data record is simply a byte of data. In others, the data record is a standard formatted record that includes a number of different data elements. One example of such a data record is an electronic address book contact record, which includes a number of different data elements in the form of address fields (e.g., first name, last name, business telephone number, e-mail address, etc.), each of which preferably comprising header information and multiple bytes of data content. In such a case of data records with fields, a standardized ordering of the data records preferably is performed as a preliminary step. By imposing a standardized order, it becomes possible to meaningfully compare different files or data sequences. One example is to sort the records based on one or more fields. On the other hand, if it can be assumed that the records are generated or delivered by a source system in a uniform manner, then a separate sorting step should be unnecessary.

In any event, once an original data-record sequence 30 has been hierarchically divided according to the present invention it generally can be efficiently compared with any other data-record sequence that has been formatted (e.g., in terms of data records) and divided in the same manner. For example, when a matching segment is found at a higher level one generally can avoid drilling down into lower levels beneath that segment. Moreover, the techniques described herein for dividing and then subdividing a sequence have been found to result in hierarchical structures that, if applied uniformly, are particularly efficient for comparing different data-record sequences.

The precise number of segments into which any given segment is divided at the next lower level of the hierarchical arrangement differs depending upon the specific embodiment of the invention. In certain embodiments of the invention, that number is generally variable depending upon characteristics of the data. In other embodiments, it is fixed.

Figure 3:
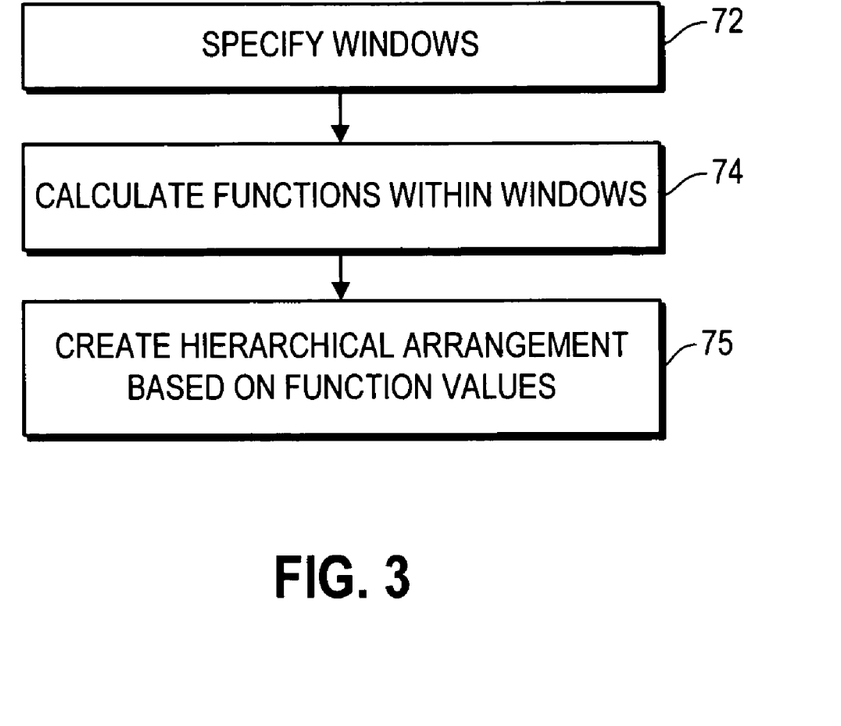
FIG. 3 illustrates a flow diagram for explaining a general technique of hierarchically dividing an initial data-record sequence, according to representative embodiments of the present invention.

FIG. 3 illustrates a flow diagram for explaining a general technique for hierarchically dividing an initial data-record sequence 30, according to representative embodiments of the present invention.

Initially, in step 72 a plurality of windows are defined. In the preferred embodiment of the invention, the windows are sized identically, are spaced equally across the starting sequence 30, and are selected so as to cover the entire initial sequence 30. More preferably, the windows are selected such that adjacent windows overlap.

Figure 4:
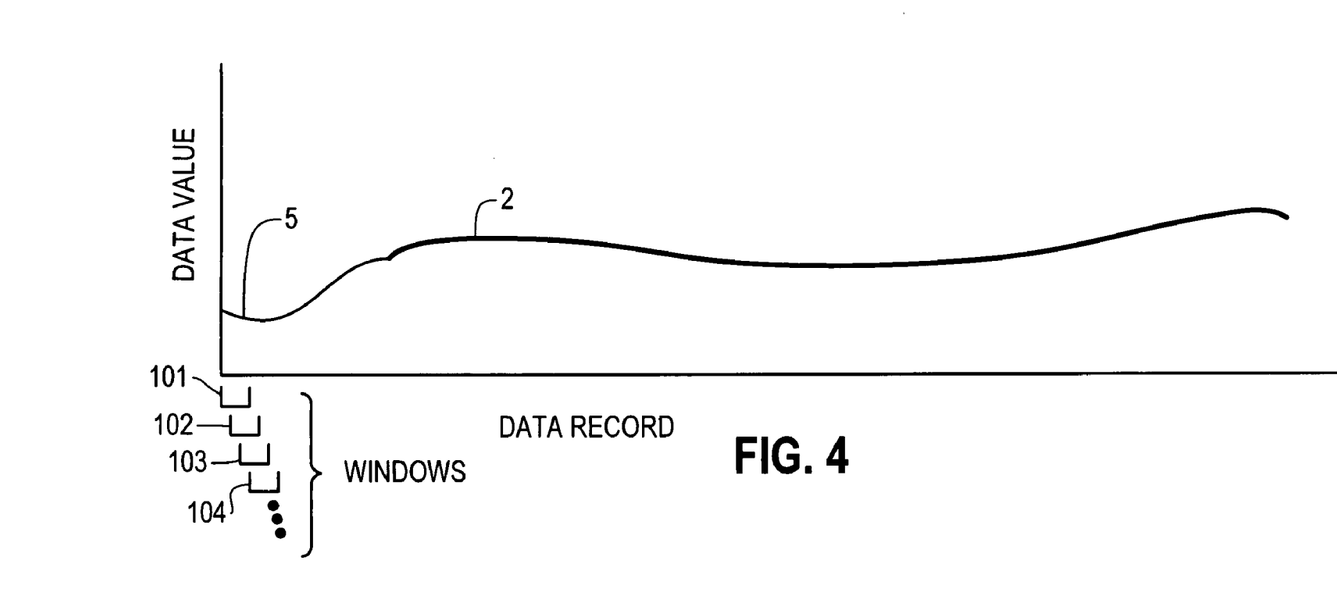
FIG. 4 illustrates a portion of an initial sequence, together with overlapping windows defined according to a representative embodiment of the present invention.

This is illustrated in FIG. 4, which shows a portion (i.e., segments 5 and 2) of the initial sequence 10 (shown in FIGS. 1A-B), and also illustrates overlapping windows 101-104 that have been defined according to a representative embodiment of the present invention. As shown, each of windows 101-104 has the same length, three data records in the present example, and the beginning of each window 101-104 is at a regular increment, every data record in the present example. Accordingly, in this example each such window 101-104 overlaps with each adjacent window by two data records. It is noted that only a portion of initial sequence 10 is illustrated in FIG. 4 so that greater detail can be shown regarding the placement of windows 101-104. For similar reasons pertaining to ease of illustration, the windows 101-104 are shown as being vertically offset from each other. Finally, although not shown in FIG. 4, the windows preferably continue in the same manner until the end of sequence 10.

It is noted that the width of the windows generally will vary from embodiment to embodiment, but for a given embodiment preferably is uniform across all windows. In the preferred embodiments of the invention, the width of a window is small enough to capture the smallest overlapping segment that is desired to be detected but large enough to avoid local effects. In certain embodiments, the windows are only a single data record wide.

The offset (or spacing from one window to the next) also can vary from embodiment to embodiment, but again for any given embodiment preferably is uniform. Preferably, the offset is small enough to accommodate the smallest incremental unit of data that is expected to be inserted between matching data record segments (e.g., segments 2 or 3); for this purpose, the offset preferably is one data record.

Referring back to FIG. 3, in step 74 a function value is calculated with respect to the data records in each window. Preferably, the function includes calculation of a fingerprint or hashing function of the data elements within the window and then calculation of a scalar quantity based on the resulting vector. For example, in the preferred embodiments of the invention, a Rabin fingerprint is calculated across the data elements in the window and then the magnitudes of the resulting vectors are determined. In any event, the function value preferably provides a pseudorandom result based on the window's contents, such as would be obtained by taking the magnitudes of the Rabin fingerprints. As used herein, a pseudorandom results means a result that generally appears to be random, although it is in fact determined based on the underlying data, and that the appearance of randomness persists even if the underlying data are in fact highly correlated with each other.

In step 75, a hierarchical arrangement is created based on the function values obtained in step 74. Different embodiments of this step are discussed below in connection with the flow diagrams illustrated in FIGS. 5 and 8.

Figure 5:
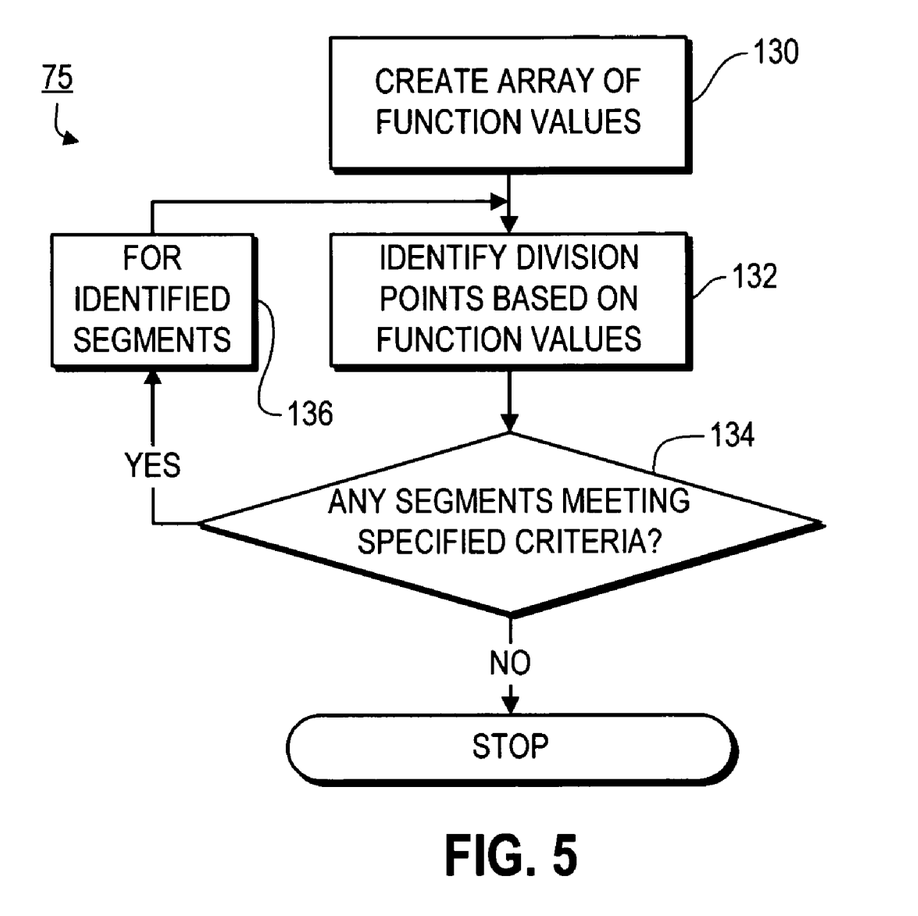
FIG. 5 is a flow diagram for explaining how to hierarchically divide a sequence of data records based on calculated function values according to a first representative embodiment of the present invention.

FIG. 5 illustrates a first representative technique for hierarchically dividing a sequence of data records based on the function values calculated in step 74. Initially, in step 130 an array of the function values is created, preferably in the same order as the corresponding windows were arranged in step 72. An example of such an array is array 160, illustrated in FIG. 6A.

Figure 6A:
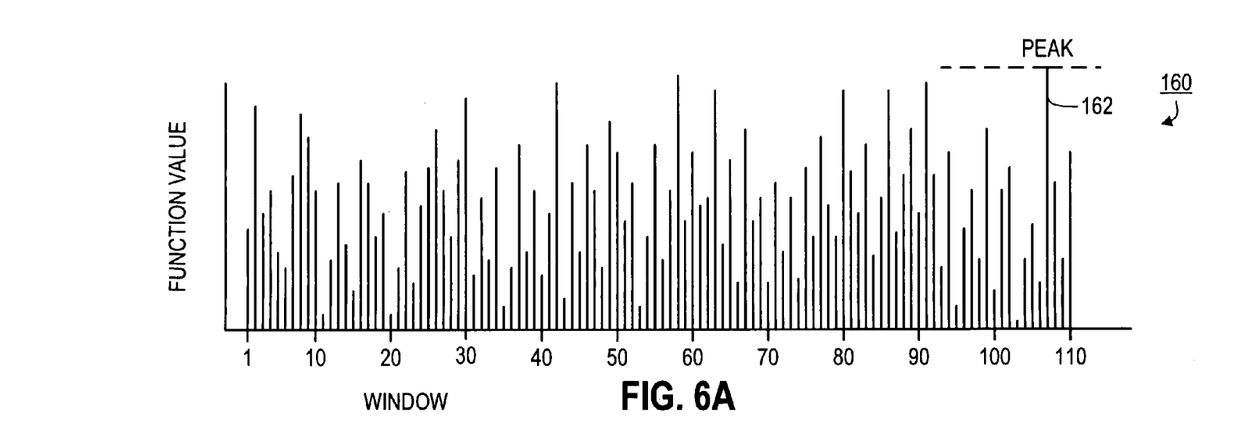
FIGS. 6A-C illustrate one example of an array of function values calculated from the overlapping windows shown in FIG. 4, and also show the selection of dividing points with respect to the array of function values, according to a representative embodiment of the present invention.

As can be seen in FIG. 6A, the function values appear to be more or less random despite the fact that the windows overlap each other and even in situations where adjacent data records are highly correlated with each other. As noted above, this is a direct result of using a function that provides a pseudorandom value, such as the magnitude of a hashing or fingerprint function. As will be seen below, such a property often is quite advantageous when implementing the techniques of the present invention.

Referring back to FIG. 5, in step 132 one or more division points are identified based on the function values. In the preferred embodiment, we use the highest function value within any given segment as of the dividing point of that segment.

However, in alternate embodiments a different criterion is used, such as the lowest value or (where the function values are vector quantities) the value that is closest to a specified direction. In any event, the use of a pseudorandom function in the present embodiment generally will mean that the division point(s) generally will appear to be substantially random (although they are completely determined by the data).

In the present example, only a single division point (at most) is used at each hierarchical level. That is, each parent node ultimately will have exactly two children and each leaf node will course have none. However, in alternate embodiments of the invention multiple division points are used with respect to all or some of the segments to be divided. In certain of such embodiments, the precise number is fixed in advance, while in others it is data-dependent. For example, in one such alternate embodiment a single division point is utilized unless there is a tie for the highest function value, in which case each of the corresponding points is used as a division point. In a slightly different embodiment, all of the function values within the subject segment that are within a specified range of the true maximum are selected as division points. Finally, in still further embodiments, at least with respect to some of the divisions, the dividing points are based on the length of, or position within, the segment to be divided, either in addition to or instead of the function values.

The actual division point can be selected anywhere relative to the window from which the selected function value was calculated, although preferably it is selected in a consistent and reproducible manner. In the present embodiment, the division point is the end of such window Preferably, as the divisions are made a hierarchical arrangement (which may be visually represented as a tree) is recorded, with the top node corresponding to the entire sequence. Each time a division is made the child nodes corresponding to the subsegments preferably are created underneath the node corresponding to the divided segment. An example illustrating the creation of such a hierarchical arrangement is given below.

Referring again to FIG. 5, in step 134 a determination is made as to whether there remain any segments that satisfy a specified criterion. In the preferred embodiments of the invention, this step determines whether there are any segments longer than a specified threshold. If so, then processing proceeds to step 136 to repeat the division process for such segments, preferably using the same criterion for identifying the dividing points. If not, then processing is concluded.

The specified threshold for the maximum segment size in the preferred embodiments of the invention generally corresponds to the accuracy of the technique in terms of identifying entire segments that are identical to each other. Thus, if the threshold is a maximum of five data records and if two files share a segment having a length of 30 data records, then it is possible that the technique could miss up to four data records on each end. Accordingly, the threshold preferably is set based upon a trade-off between how much accuracy is desired, on the one hand, and processing/storage requirements on the other. On the other hand, in certain embodiments of the invention of this problem is overcome during the comparison technique, as described in more detail below.

Figure 6B:
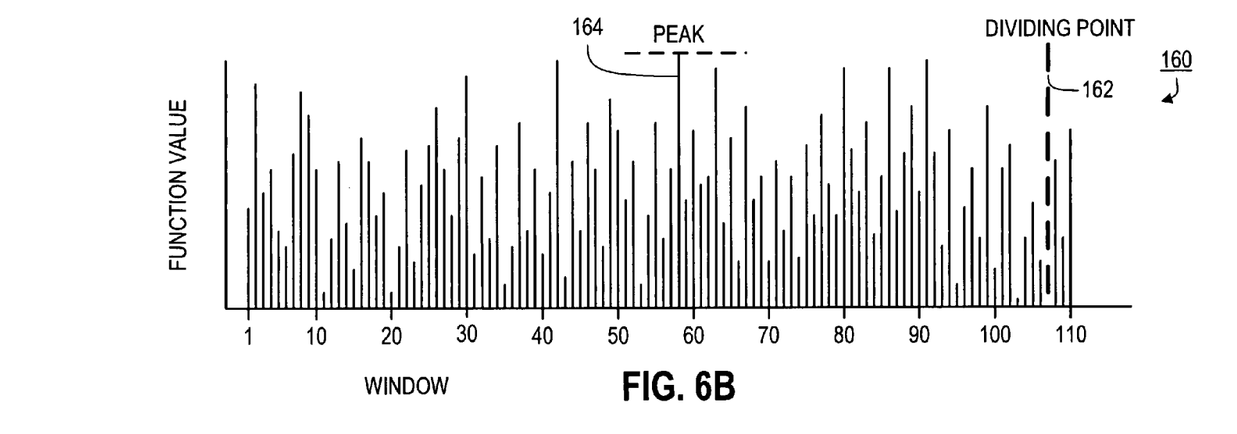
Figure 6C:
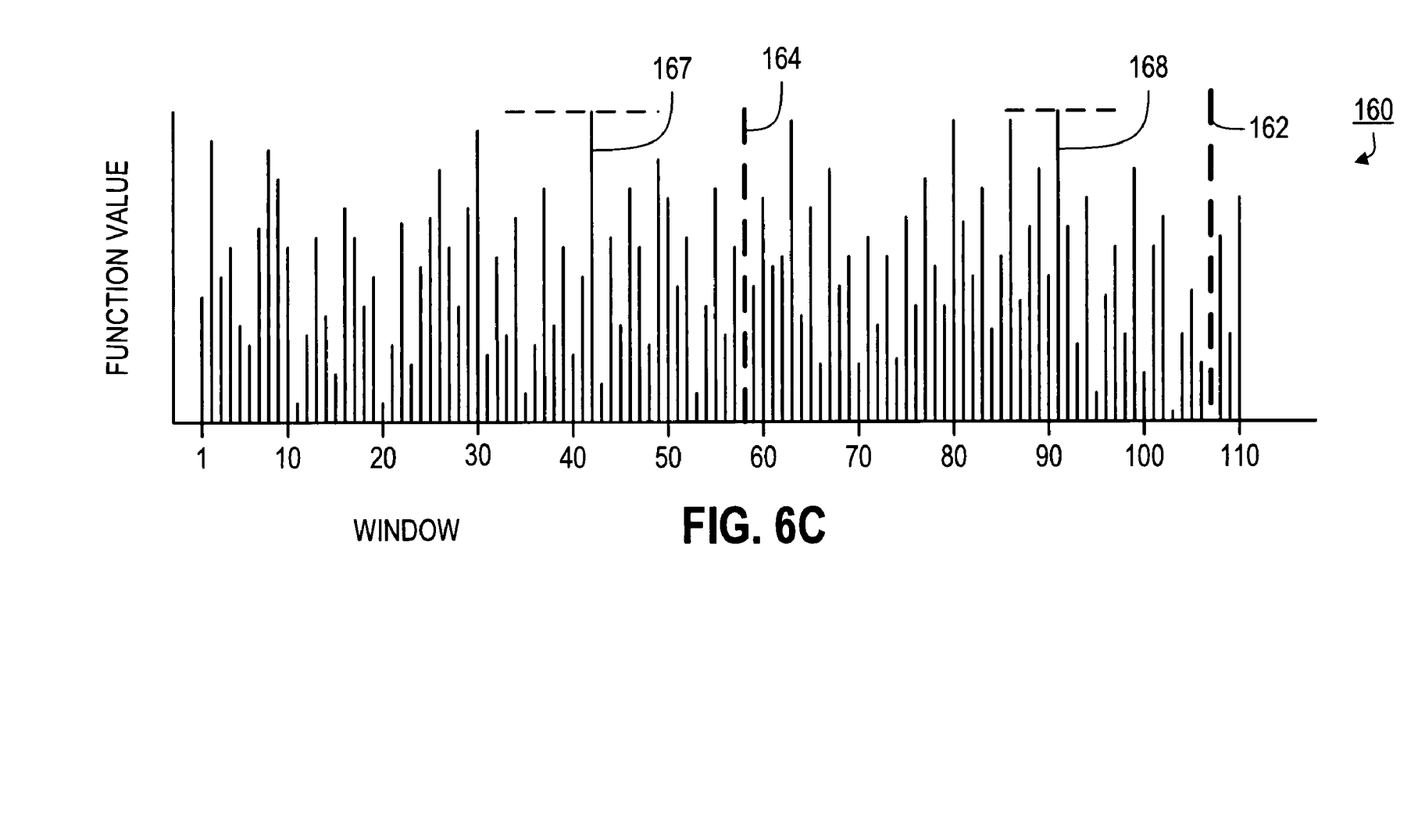

An example of the foregoing technique is now described with reference to FIGS. 6A-C and 7. Each of FIGS. 6A-C illustrates the array of function values 160 calculated from the overlapping windows shown in FIG. 4. For purposes of the present example, we will assume that FIG. 4 illustrates the entire initial sequence 30 that is to be processed. Also, in this example each node (or its corresponding segment) is to be divided into exactly two nodes (or corresponding subsegments) by selecting a dividing point corresponding to the highest function value, or the leftmost highest function value in the event of ties. For this example, we also select the minimum length for further subdivision of a segment to be five data records.

Figure 7:
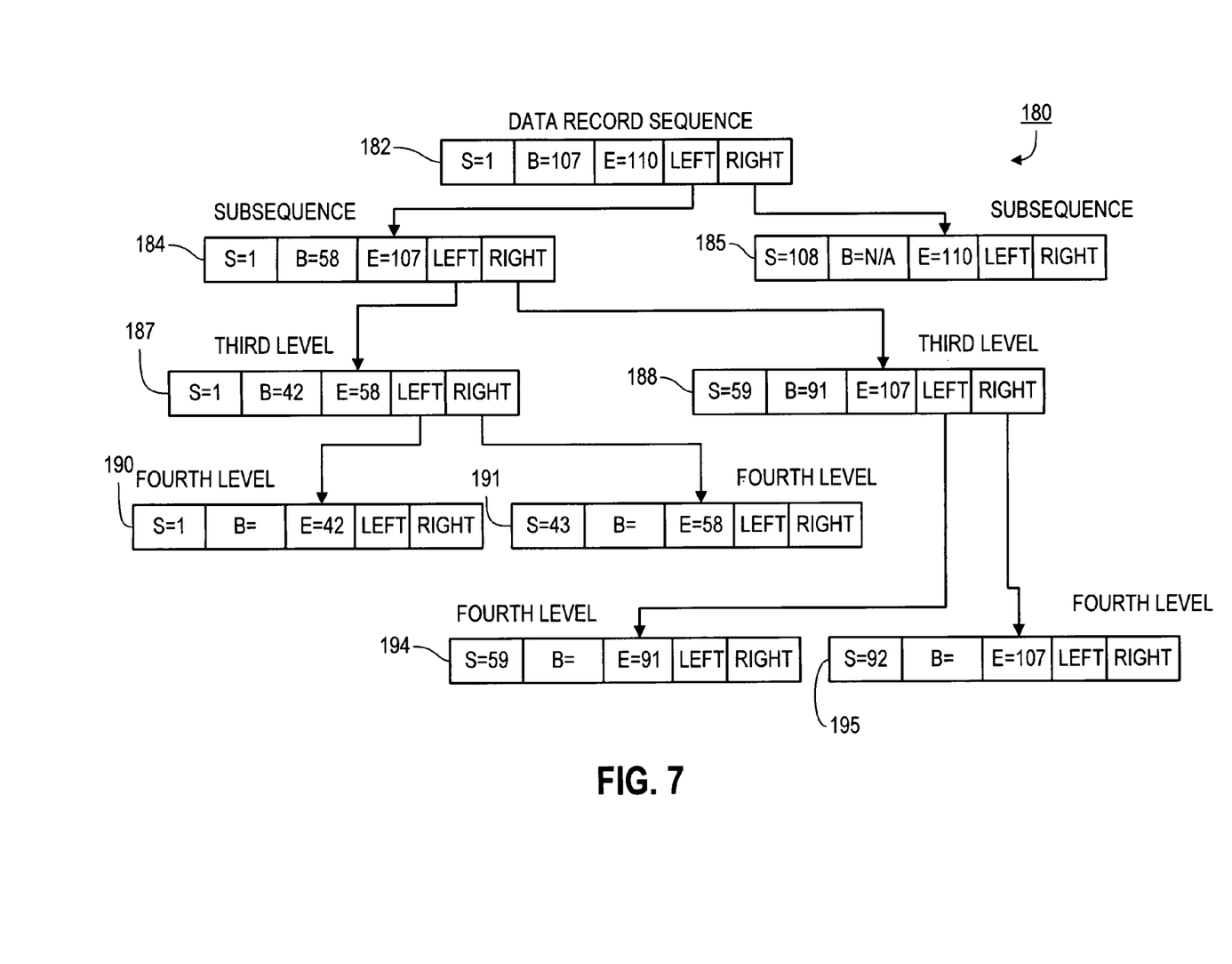
FIG. 7 illustrates a portion of a hierarchical directed acyclic graph generated from the array of function values shown in FIGS. 6A-C in accordance with a representative embodiment of the present invention.

FIG. 7 illustrates a portion 180 of the hierarchical arrangement that results from the segmentation in the present example. Although the entire portion 180 is shown in FIG. 7, initially only a single node 182 corresponding to the entire input sequence 30 exists. As shown, each node preferably includes a field indicating the starting point, the break (or dividing) point, the endpoint, a pointer to a left-side child node and a pointer to a right-side child node, although the breakpoint, left-side child node pointer and right-side child node pointer typically will be empty for leaf nodes and the nodes that have not yet been processed.

Referring to FIG. 6A, we identify the maximum value occurring at position 162 (the $107^{th}$ sample). Accordingly, we select this is the dividing point. As shown in FIG. 7, we next record underneath entire-sequence node 182 child nodes 184 and 185, corresponding to the segments to the left and to the right, respectively, of position 162.

We then repeat the process for the segment corresponding to node 184. In this case, as shown in FIG. 6B, the maximum occurs at position 164 (the $58^{th}$ sample). Accordingly, we select this is the dividing point and, as shown in FIG. 7, we record underneath segment node 184 child nodes 187 and 188. These new nodes correspond to the segments to the left and to the right, respectively, of position 164 in the segment corresponding to node 184.

As to the other child node 185 of node 182, we determine immediately (e.g., by subtracting the starting point from end point) that the length of the corresponding segment is less than the established threshold of five data records. Accordingly, it is not further divided (i.e., it becomes a leaf node).

Next, we repeat the division process for the segments corresponding to nodes 187 and 188. In this case, as shown in FIG. 6C, the maximum function value for the segment corresponding to node 187 occurs at position 167 (the $42^{nd}$ sample), and the maximum function value for the segment corresponding to node 188 occurs at position 168 (the $91^{st}$ sample). We therefore select these as the dividing points of their corresponding segments. Then, as shown in FIG. 7, we record underneath segment node 187 child nodes 190 and 191, and we record underneath segment node 188 child nodes 194 and 195.

The foregoing process of dividing segments and creating a corresponding hierarchical representation is repeated, in the present example, until all resulting leaf-node segments have a length that is not greater than five data records.

The technique for generating the hierarchical arrangement discussed above in connection with FIG. 5, as well as the immediately preceding example, is a relatively straightforward top-down recursive technique for implementing the specified embodiment of the invention. Another technique for implementing this embodiment is now described with reference to the flow diagram illustrated in FIG. 8, which illustrates an implementation of steps 74 and 75 (shown in FIG. 3). In many cases, the technique of FIG. 8 will be able to obtain the same results more efficiently, as it primarily involves a single one-directional linear scan of the data-record sequence or, more descriptively, of the array of function values that corresponds to the data-record sequence.

Figure 8:
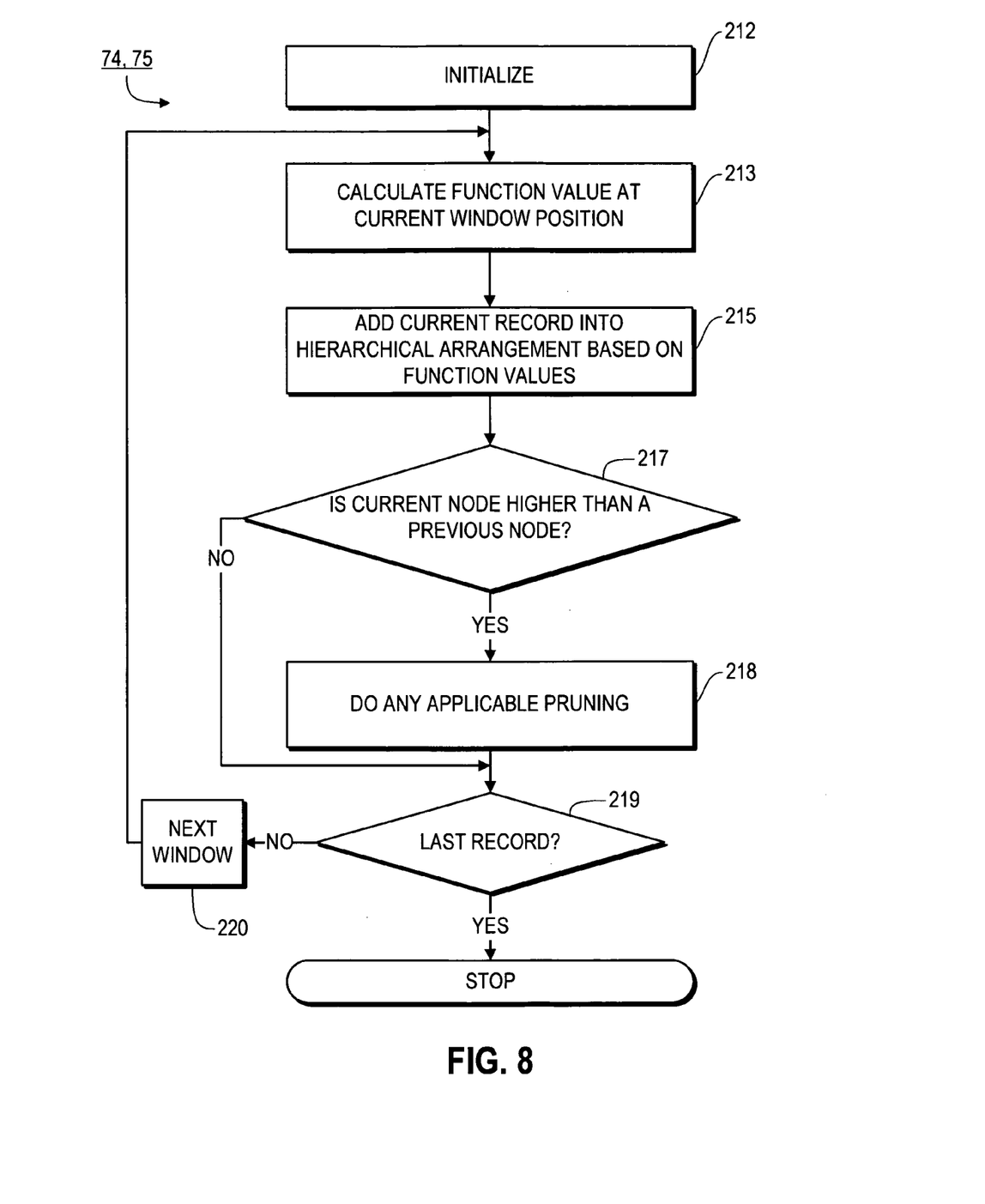
FIG. 8 is a flow diagram for explaining how to calculate function values for, and then hierarchically divide, a sequence of data records according to a second representative embodiment of the present invention.

Initially, in step 212 a sliding window position is initialized to the beginning of the sequence of data records. An example is the first window position 101 (shown in FIG. 4). Also in this step, the hierarchical arrangement is initialized to the empty set.

In step 213, the function value is calculated for the current window position. This step preferably is a straightforward implementation of a 74, which is shown in FIG. 3, for a single window position.

In step 215 a node corresponding to the current data record is added into the hierarchical arrangement at the appropriate position based on a comparison of the function value of the current data record to the other function values in the hierarchical arrangement up to that point, e.g., by walking up the tree from the immediately preceding node (e.g., starting with the bottom rightmost node) and inserting the current value at the appropriate level in the tree. Often, the new addition will be a new leaf node.

In step 217, a determination is made as to whether the function value of current node is greater than that of the immediately preceding node X. If so, then processing proceeds to step 218 to make that node X subordinate to the new node, and perform any applicable pruning. As noted above, the preferred embodiments of the invention do not divide segments that are shorter than a specified length. Accordingly, in this step the process preferably looks leftwardly from the current node and prunes any nodes that are shorter than this specified length.

In step 219, a determination is made as to whether the record that was just processed was the last record. If so, then processing is complete. Otherwise, processing proceeds to step 220 to select the next window position and then returns to step 213 to process that window.

Thus, the foregoing technique allows the hierarchical arrangement to be created in a single one-directional pass through the file or other data-record sequence, with only limited, periodic backtracking to perform any applicable pruning.

Figure 9:
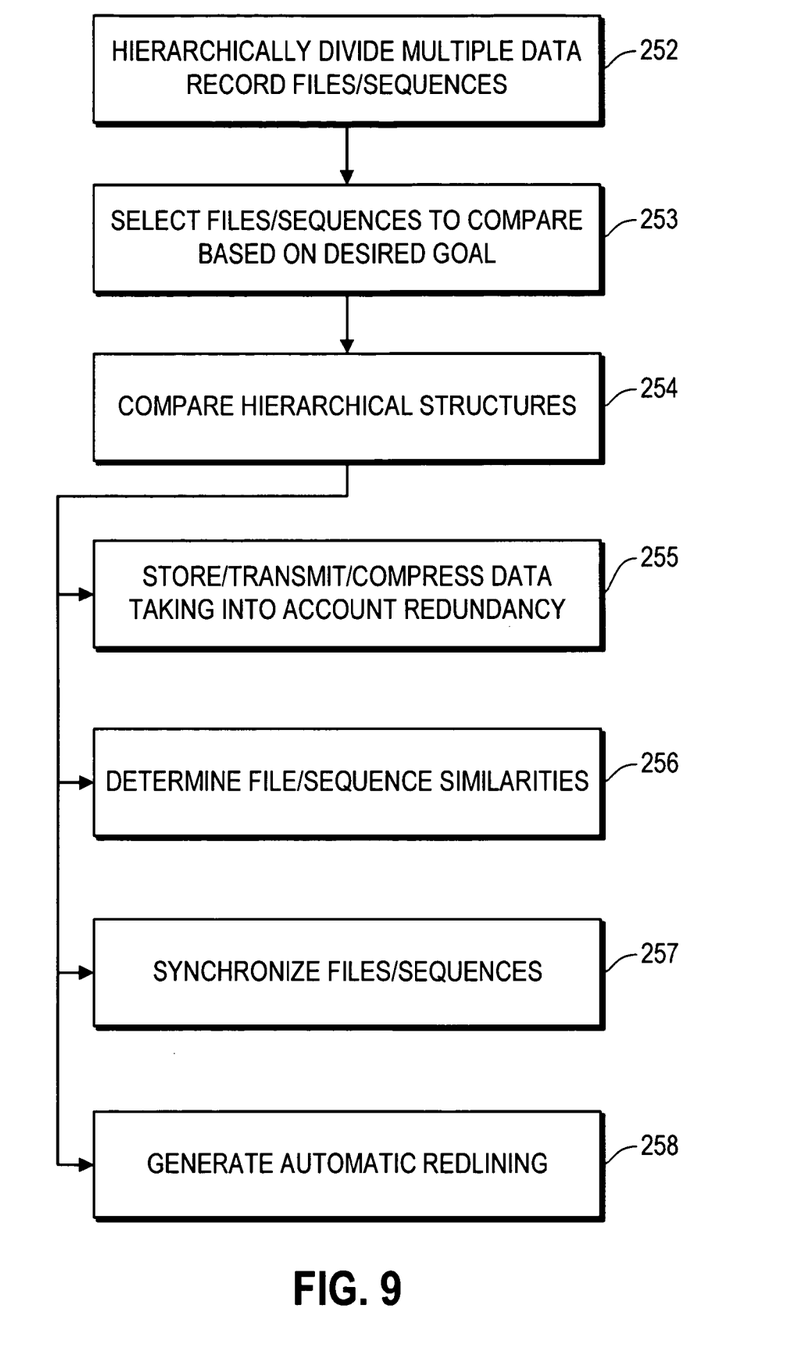
FIG. 9 is a flow diagram for explaining the use of the hierarchical arrangement generated pursuant to FIG. 3, according to representative embodiments of the present invention.

FIG. 9 is a flow diagram for explaining certain uses of the hierarchical arrangement generated pursuant to FIG. 3, according to representative embodiments of the present invention.

Initially, in step 252 multiple files or other data-record sequences are divided, preferably using any of the techniques of the present invention. More preferably, the specific dividing algorithm is consistent (e.g. identical) across all of such files or data-record sequences, in terms of both the general technique and all parameters thereof (e.g., window size, window offset, specific function used, minimum segment-length criterion for further division, and criterion for selecting the dividing point(s) within a segment). It is noted that the use of a consistent dividing technique often will permit comparison of any two data-record sequences that have been so processed by comparing their resulting hierarchical arrangements (e.g., HDAGs).

In step 253, the files or other data-record sequences to be compared are selected based on the desired goals. For instance, if the goal is to find any files within a specified set that share a minimum percentage of their content with an identified file, then the identified file individually will be paired with each file in the specified set for separate comparison. In other examples, e.g., where two files are to be compared for the purpose of automatically generating a redlined document (i.e., one marked to show the differences, such as deletions, additions and moves, between the two), the two input files to be compared already will have been identified, so no further selection will need to be performed in this step 253.

In step 254, the hierarchical structures (e.g., HDAGs) for the two selected files/sequences are compared in order to identify any matching segments. In representative embodiments, this step is performed using conventional comparison algorithms, e.g., using the function values generated pursuant to the initial division technique, using a hash or fingerprint of the windows or of the nodes, using the actual data in the data records or using any combination of the two. For example, in one representative embodiment if the hashes or fingerprints of two nodes match, then it is assumed that the corresponding subtrees are identical. Although it is possible to compare the actual data records to verify that the two segments are in fact identical, this rarely would be necessary. On the other hand, if the hashes or fingerprints do not match, then it generally is desirable to go further down the subtree to determine if any lower-level subtrees match.

In any event, because of the hierarchical structure that is generated pursuant to the present invention, if a match is made at a particular node, then there often will be no need to go down the subtree for that node, thereby avoiding a significant amount of additional effort. In one particular embodiment of the invention, a second function value (e.g., also the magnitude of a fingerprinting function, the fingerprint or hash itself, or any other function providing pseudorandom results) has been calculated and stored for the entire segment corresponding to each node of the hierarchical arrangement. Accordingly, any node in one file or other sequence can be compared to a node in another file or sequence by simply comparing their function values. Once again, verification by looking at the underlying data is possible but generally not advisable (at least where hashes have been calculated) because for most hashes it is extremely unlikely that two corresponding segments will be different if the hashes are identical.

Conversely, because of the data-specific and consistent manner in which the hierarchical structure preferably is generated, in certain cases a non-matching function value also will indicate that the process does not need to explore a particular subtree. For instance, in the example given above the highest magnitude function value always is selected as the division point. Accordingly, if the comparison process is comparing a node in a first hierarchical arrangement (corresponding to a first sequence) to another node in a second hierarchical arrangement (corresponding to a second sequence), and if the function value for the node in the first hierarchical arrangement is higher than the function value for the node in the second hierarchical arrangement, then there is no need to go further down the tree underneath the node in the second hierarchical arrangement because all of the function values underneath it will be even lower (and therefore cannot possibly match the function value for the node in the first hierarchical arrangement).

The result of this step 254 is a list of matching nodes (and their corresponding segments) for the two input files or other data-record sequences. In certain representative embodiments, one such matching segments have been identified additional data records at each end of the identified segments also are compared to determine if the matching segments can be supplemented. Such an optional step often is desirable where precision is important but where certain aspects of the dividing technique (e.g., minimum segment length for additional subdivision) otherwise preclude a certain determination that the entire length of the matching segment has been identified.

In any event, for two input files or other data-record sequences, the foregoing steps provide a list of matching segments within those sequences. Any of a variety of different uses can be made of this information, such as indicated below in connection with steps 255-258.

For instance, in step 255 the identification that two files share one or more long identical segments of data records can be used to efficiently store the two files in memory (e.g., storing the common segment only once). More generally, in this step any two files/sequences are stored, transmitted to a remote location or otherwise compressed by taking advantage of the overlapping segments to conserve resources (e.g., storing or transmitting the overlapping segments only one time for both files).

In step 256, based on the matching segments and, in certain cases, other information pertaining to the two files/sequences, a measure of the similarity between the two files/sequences is determined. Preferably, this step determines how much data two files have in common, e.g., by calculating the percentage of the content, or the total amount of content (e.g., in bytes), by which the two files/sequences overlap. Any such similarity information can be useful in a variety of different contexts. For example, such information is used in one embodiment for the purpose of displaying search results in response to a user query. In this example, if the initial search retrieves two files whose contents are 99% identical (e.g., an original e-mail message and a forwarded copy of it), then the search engine preferably displays (at least at the first level) only one of the two files (e.g., the one that is more comprehensive), together with a link to the other indicating "others like this" or similar language).

In step 257, the shared-segment information is used to synchronize the two files/sequences. Such an application is particularly useful in cases where two copies of an original source file have been separately edited or otherwise changed. In such a case, all updates to one of the two files/sequences are incorporated into the other and vice versa, so that the changes and updates to two separate copies of the file are merged with each other. Such synchronization facilitates collaboration among multiple individuals and permits automatic correction of a situation where an individual user inadvertently separately has edited two copies of the same file.

In step 258, the two files comprise an older version and a newer version of the same document, and a redline version highlighting the changes between the two (e.g., insertions, deletions, moves) automatically is generated. That is, similar to the synchronization implementation of step 257, this step 258 focuses on the differences between two different files or other sequences.

System Environment.

Generally speaking, nearly all of the methods and techniques described herein can be practiced with the use of a general-purpose computer system. Such a computer typically will include, for example, at least some of the following components interconnected with each other, e.g., via a common bus: one or more central processing units (CPUs), read-only memory (ROM), random access memory (RAM), input/output software and/or circuitry for interfacing with other devices and for connecting to one or more networks (which in turn, in many embodiments of the invention, connect to the Internet or to any other networks), a display (such as a cathode ray tube display, a liquid crystal display, an organic light-emitting display, a polymeric light-emitting display or any other thin-film display), other output devices (such as one or more speakers, a headphone set and/or a printer), one or more input devices (such as a mouse, touchpad, tablet, touch-sensitive display or other pointing device; a keyboard, a microphone and/or a scanner), a mass storage unit (such as a hard disk drive), a real-time clock, a removable storage read/write device (such as for reading from and/or writing to RAM, a magnetic disk, a magnetic tape, an opto-magnetic disk, an optical disk, or the like), and a modem (which also preferably connect to the Internet or to any other computer network via a dial-up connection). In operation, the process steps to implement the above methods, to the extent performed by such a general-purpose computer, typically initially will be stored in mass storage (e.g., the hard disk), are downloaded into RAM and then executed by the CPU out of RAM.

Suitable computers for use in implementing the present invention may be obtained from various vendors. Various types of computers, however, may be used depending upon the size and complexity of the tasks. Suitable computers include mainframe computers, multiprocessor computers, workstations, personal computers, and even smaller computers such as PDAs, wireless telephones or any other appliance or device, whether stand-alone, hard-wired into a network or wirelessly connected to a network. In addition, although a general-purpose computer system has been described above, in alternate embodiments a special-purpose computer instead (or in addition) is used. In particular, any of the functionality described above can be implemented in software, hardware, firmware or any combination of these, with the particular implementation being selected based on known engineering tradeoffs. In this regard, it is noted that the functionality described above primarily is implemented through fixed logical steps and therefore can be accomplished through programming (e.g., software or firmware), an appropriate arrangement of logic components (hardware) or any combination of the two, as is well-known in the art.

It should be understood that the present invention also relates to machine-readable media on which are stored program instructions for performing the methods of this invention. Such media include, by way of example, magnetic disks, magnetic tape, optically readable media such as CD ROMs and DVD ROMs, semiconductor memory such as PCMCIA cards, etc. In each case, the medium may take the form of a portable item such as a small disk, diskette, cassette, etc., or it may take the form of a relatively larger or immobile item such as a hard disk drive, ROM or RAM provided in a computer.

The foregoing description primarily emphasizes electronic computers. However, it should be understood that any other type of computer instead may be used, such as a computer utilizing any combination of electronic, optical, biological and/or chemical processing.

Additional Considerations.

The discussion above considers an initial sequence of data records. Often, each data record simply will be a byte of data. However, in situations where files or other data sequences to be compared share a common structure, and particularly where it is highly unlikely that data would be inserted into any particular file/sequence except in accordance with that common structure, the dividing technique (which functions as a form of pre-processing) preferably utilizes more complicated data records that are recognized within such common structure. Taking advantage of such structure often will result in additional efficiencies because of the process will not need to go down to the byte level.

The preferred embodiments of the invention utilize a function of the data records within each window that provides pseudorandom results. This often is advantageous because it provides a consistent way of dividing data-record segments in a way that appears arbitrary but actually is data-dependent. As a result, data-record segments generally can be subdivided to any desired level into subsegments that are, on average, approximately equal in length, with the assurance that a different sequence that has a matching segment will be divided in substantially the same way, at least at some level of the hierarchical subdivision.

In the embodiments described above, the function values are compared against each other to find identical segments within two separate sequences. In alternate embodiments, the process uses a function that provides some measure of the content of the corresponding window, e.g., "soft hashes" that provide characteristic information, such as a "sketch" or a distance metric with respect to some identified standard. As a result, rather than looking for identical function values, the technique preferably is modified to search for similar or close function values, indicating that the corresponding segments are similar to each other, or match each other, in some specified (explicit or implicit) manner. Also, in alternate embodiments other techniques are utilized to find matching segments. In one representative embodiment, segments are said to match each other if they have a predetermined minimum number of identical characters, symbols or subsegments.

In the embodiments described above, with respect to a particular file or other data sequence, fingerprint or hashing function values are stored for the entire hierarchical structure. In alternate embodiments, function values are stored in a heap only for the highest nodes in the structure (e.g., only the top 5% nodes). As a result, memory requirements are reduced. Then, during any particular comparison the function values can be recalculated whenever it is decided to go lower into the hierarchical structure.

Also, several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of hierarchically segmenting a sequence of records, comprising:
    (a) obtaining a first sequence of data records;
    (b) specifying a plurality of windows, each window encompassing a portion of the first sequence;
    (c) for each specified window, calculating, by a computer system, a function of the data records within said specified window in order to generate a function value for said specified window;
    (d) based on the function values, defining, by the computer system, a first hierarchical arrangement in which the first sequence is divided into a plurality of segments and the segments are divided into smaller segments;
    (e) applying steps (a)-(d) to a second sequence in order to obtain a second hierarchical arrangement for the second sequence;
    (f) comparing the first hierarchical arrangement to the second hierarchical arrangement in order to identify matching subsequences of the first sequence and the second sequence; and
    (g) outputting information based on the matching subsequences identified.

2. A method according to claim 1, wherein the function provides a pseudorandom result, and wherein the generated function values are pseudorandom values.

3. A method according to claim 1, wherein only absolutely identical subsequences are identified in step (f).

4. A method according to claim 1, wherein the first sequence obtained in step (a) comprises unordered database records, and further comprising a preliminary step of ordering the database records.

5. A method according to claim 1, wherein the function comprises a hashing function.

6. A method according to claim 1, wherein each dividing in step (d) is made with respect to a subject segment by finding at least one function value within the subject segment that most closely satisfies a specified criterion, which specified criterion is identical across all hierarchical levels of the first hierarchical arrangement.

7. A method according to claim 1, wherein the first hierarchical arrangement is generated in a top-down fashion by successively dividing the first sequence into the segments and then dividing the segments into the smaller segments.

8. A method according to claim 1, wherein the first hierarchical arrangement is generated incrementally by adding the records into the first hierarchical arrangement as the first sequence is scanned in a single direction.

9. A method according to claim 1, further comprising calculating a hashing function for each segment in all levels of the first hierarchical arrangement.

10. A method according to claim 1, wherein the function is a Rabin's Fingerprint.

11. A method according to claim 1, wherein each window specified in step (b) encompasses a contiguous portion of the first sequence.

12. A method according to claim 1, further comprising visually displaying a depiction of at least a portion of the first hierarchical arrangement.

13. A method according to claim 1, further comprising a step of at least one of: (i) compressing the first sequence and the second sequence by taking into account redundancy identified in step (f); (ii) calculating and providing a metric that represents an amount of similarity between the first sequence and the second sequence; (iii) copying data from the first sequence to the second sequence and from the second sequence to the first sequence, in order to synchronize the first sequence and the second sequence; and (iv) generating and providing a document that visually highlights differences between the first sequence and the second sequence.

14. A method according to claim 1, wherein specifying the plurality of windows comprises providing a sliding window that is moved across the first sequence.

15. A method according to claim 1, further comprising:
    for a given segment of the plurality of segments, dividing the given segment at a position corresponding to a function value satisfying a criterion.

16. A method according to claim 15, wherein at least one of the plurality of segments is not divided because the at least one segment has a length less than a predetermined threshold.

17. A method according to claim 15, wherein the given segment is divided at a position corresponding to a highest function value of the function values associated with the given segment.

18. A method according to claim 1, wherein adjacent ones of the plurality of windows overlap such that the adjacent ones of the windows share at least one data record.

19. A machine-readable medium storing computer-executable instructions for hierarchically segmenting a sequence of records, said instructions upon execution by a computer system for performing:
(a) obtaining a first sequence of data records;
(b) specifying a plurality of windows, each window encompassing a portion of the first sequence;
(c) for each specified window, calculating a function of the data records within said specified window in order to generate a function value for said specified window;
(d) based on the function values, defining a first hierarchical arrangement in which the first sequence is divided into a plurality of segments and the segments are divided into smaller segments,
applying the method of steps (a)-(d) to a second sequence in order to obtain a second hierarchical arrangement for the second sequence; and
comparing the first hierarchical arrangement to the second hierarchical arrangement in order to identify matching subsequences of the first sequence and the second sequence.

20. A machine-readable medium according to claim 19, wherein the function provides a pseudorandom result, and the function values are pseudorandom values.

21. A computer-readable medium according to claim 19, wherein the first sequence obtained in step (a) comprises unordered database records, and wherein the instructions upon execution cause the computer system to further perform a preliminary step of ordering the database records.

22. A machine-readable medium according to claim 19, wherein the instructions upon execution by the computer system are for further performing:
for a given segment of the plurality of segments, dividing the given segment at a position corresponding to a function value satisfying a criterion.

23. The machine-readable media according to claim 19, wherein adjacent ones of the plurality of windows overlap such that the adjacent ones of the windows share at least one data record.

24. A machine-readable medium storing computer-executable instructions for hierarchically segmenting a sequence of records, said instructions upon execution by a computer system for performing:
(a) obtaining a first sequence of data records;
(b) specifying a window that encompasses a portion of the first sequence;
(c) calculating a function of the data records within said specified window in order to generate a function value for said specified window;
(d) inserting a node into a first hierarchical structure based on the function value;
(e) comparing the function value for the specified window with function values for previously inserted nodes in the first hierarchical structure, and, based on said comparison, pruning from the first hierarchical structure any nodes corresponding to segments shorter than a specified length; and
(f) repeating steps (b)-(e) for a plurality of additional windows,
wherein the first hierarchical structure represents a hierarchical segmentation of the first sequence of data records into segments and sub-segments of the segments.

25. A machine-readable medium according to claim 24, wherein the function provides a pseudorandom result.

26. A machine-readable medium storing computer-executable instructions for hierarchically segmenting a sequence of records, said instructions upon execution by a computer system for performing:
(a) obtaining a first sequence of data records;
(b) specifying a window that encompasses a portion of the first sequence;
(c) calculating a function of the data records within said specified window in order to generate a function value for said specified window;
(d) inserting a node into a first hierarchical structure based on the function value;
(e) comparing the function value for the specified window with function values for previously inserted nodes in the first hierarchical structure, and, based on said comparison, pruning from the first hierarchical structure any nodes corresponding to segments shorter than a specified length; and
(f) repeating steps (b)-(e) for a plurality of additional windows,
wherein the first hierarchical structure represents a hierarchical segmentation of the first sequence of data records into segments and sub-segments of the segments;
wherein the function provides a pseudorandom result,
(g) applying steps (a)-(f) to a second sequence in order to obtain a second hierarchical arrangement for the second sequence; and
(h) comparing the first hierarchical arrangement to the second hierarchical arrangement in order to identify matching subsequences of the first sequence and the second sequence.

* * * * *